(12) United States Patent
Contreras et al.

(10) Patent No.: US 8,599,506 B2
(45) Date of Patent: Dec. 3, 2013

(54) INTEGRATING CONTROL OF SLIDER BIAS POTENTIAL, TOUCH-DOWN DETECTION AND FLY-HEIGHT DETERMINATION IN A HDD

(75) Inventors: John Contreras, Palo Alto, CA (US); Bernhard E. Knigge, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 643 days.

(21) Appl. No.: 12/651,259

(22) Filed: Dec. 31, 2009

(65) Prior Publication Data

US 2011/0157736 A1 Jun. 30, 2011

(51) Int. Cl.
*G11B 27/36* (2006.01)
*G11B 20/06* (2006.01)

(52) U.S. Cl.
USPC .......................................................... 360/31

(58) Field of Classification Search
None
See application file for complete search history.

(56) References Cited

U.S. PATENT DOCUMENTS

| | | | |
|---|---|---|---|
| 5,991,113 A * | 11/1999 | Meyer et al. ..................... 360/75 |
| 6,046,596 A | 4/2000 | Schaenzer et al. |
| 6,052,249 A | 4/2000 | Abraham et al. |
| 6,239,936 B1 | 5/2001 | Abraham et al. |
| 6,239,954 B1 | 5/2001 | Segar et al. |
| 6,262,572 B1 | 7/2001 | Franco et al. |
| 6,486,660 B1 * | 11/2002 | Luse et al. ..................... 324/210 |
| 6,700,724 B2 | 3/2004 | Knippenberg et al. |
| 6,822,814 B2 | 11/2004 | Ng et al. |
| 6,999,265 B1 | 2/2006 | Schreck et al. |
| 7,046,473 B2 | 5/2006 | Fu et al. |
| 7,068,449 B2 | 6/2006 | Riddering et al. |
| 7,199,960 B1 | 4/2007 | Schreck et al. |
| 7,440,217 B2 | 10/2008 | Ono et al. |
| 7,440,219 B2 | 10/2008 | Zhu et al. |
| 7,450,333 B2 | 11/2008 | Hirano et al. |
| 7,719,786 B1 * | 5/2010 | Baumgart et al. ............... 360/75 |
| 2002/0114108 A1 * | 8/2002 | Bement et al. ............. 360/245.4 |
| 2003/0058559 A1 | 3/2003 | Brand et al. |
| 2005/0088772 A1 * | 4/2005 | Baumgart et al. ............... 360/75 |
| 2008/0158715 A1 * | 7/2008 | Hirano et al. .................... 360/75 |
| 2008/0186621 A1 * | 8/2008 | Partee ........................ 360/97.02 |
| 2008/0225426 A1 | 9/2008 | Roy et al. |
| 2011/0069408 A1 * | 3/2011 | Kurita et al. ..................... 360/59 |
| 2011/0157736 A1 * | 6/2011 | Contreras et al. ............... 360/29 |
| 2011/0157740 A1 * | 6/2011 | Baumgart et al. ............... 360/75 |

FOREIGN PATENT DOCUMENTS

| | | |
|---|---|---|
| JP | 55150123 | 11/1980 |
| JP | 3224118 | 10/1991 |
| JP | 9097483 | 4/1997 |

OTHER PUBLICATIONS

Dushkes, et al., "Head Crash Detector", *IBM Technical Disclosure Bulletin*, (May 1971),3685.

* cited by examiner

*Primary Examiner* — Peter Vincent Agustin

(57) ABSTRACT

A hard disk drive (HDD) including a slider. The slider includes a resistive temperature detector (RTD) configured to detect a temperature generated by one or more of slider spacing and contact with a media of said HDD. HDD also includes a slider signal controller configured to control bias signal of a slider with respect to a media potential, a real-time media-disk fly-height and contact detector configured to detect one or more of temperature generated by real-time media-disk slider spacing and real-time media-disk contact, and a real-time relative fly-height determiner configured to detect real-time relative fly-height of the slider based on analysis of a modulated portion of a high-frequency signal coupled to an element of the slider.

18 Claims, 4 Drawing Sheets

400

```
┌─────────────────────────────────────────────┐
│ control slider bias potential with respect   │
│ to a media bias potential                    │
│ 410                                          │
└─────────────────────────────────────────────┘
                      ↓
┌─────────────────────────────────────────────┐
│ detect media-disk fly-height and/or contact │
│ in real-time based on temperature generated │
│ by a real-time media-disk slider spacing    │
│ and/or real-time media-disk contact          │
│ 420                                          │
└─────────────────────────────────────────────┘
                      ↓
┌─────────────────────────────────────────────┐
│ determine fly-height of the slider in real- │
│ time based on a high-frequency signal       │
│ coupled to an element of a slider, wherein  │
│ the controlling slider bias potential, the  │
│ detecting media-disk fly-height and/or      │
│ contact and the determining fly-height of   │
│ the slider occur substantially simultaneously│
│ 430                                          │
└─────────────────────────────────────────────┘

┌─────────────────────────────────────────────┐
│ couple a thermal fly-height control (TFC)    │
│ element to a RTD                             │
│ 440                                          │
└─────────────────────────────────────────────┘

┌─────────────────────────────────────────────┐
│ Utilized read back data signal as high-     │
│ frequency signal to read transducer          │
│ 445                                          │
└─────────────────────────────────────────────┘

┌─────────────────────────────────────────────┐
│ capacitively couple the RF signal to a read │
│ transducer                                   │
│ 450                                          │
└─────────────────────────────────────────────┘

┌─────────────────────────────────────────────┐
│ capacitively couple the RF signal to a write│
│ transducer.                                  │
│ 460                                          │
└─────────────────────────────────────────────┘
```

FIG. 4

INTEGRATING CONTROL OF SLIDER BIAS POTENTIAL, TOUCH-DOWN DETECTION AND FLY-HEIGHT DETERMINATION IN A HDD

BACKGROUND

Hard disk drives (HDD) include read and write transducers that reside within a slider, which flies over a recording media/disk. Increasing demand in data density requires that the read and write transducers fly closer to the media. Accordingly, the fly-height between the slider and disk is increasingly important as storage densities also increase.

A thermal fly-height control (TFC) device (e.g., heater element) can be disposed within a slider to contort the slider near the read and write transducers (or elements), which lowers the fly-height for the read and write transducers. To verify the relative fly-height, the read-back signal's amplitude and a Wallace spacing loss relationship can be utilized. However, the read-back signal measurement may not provide an accurate fly-height. With a slider flying as close as possible to a disk, write element slider-media contact (WEC) may occur, which creates unstable slider-fly dynamics, which in turn, creates data imprint errors in the media. Moreover, fly-height is also affected by lubricant-slider interaction and electrostatic force.

BRIEF DESCRIPTION OF THE DRAWINGS

FIG. 4 illustrates an example of a flow chart of a method for integrating control of slider bias potential, touch-down detection and fly-height determination in a HDD, in accordance with an embodiment of the present invention.

Figure 1:
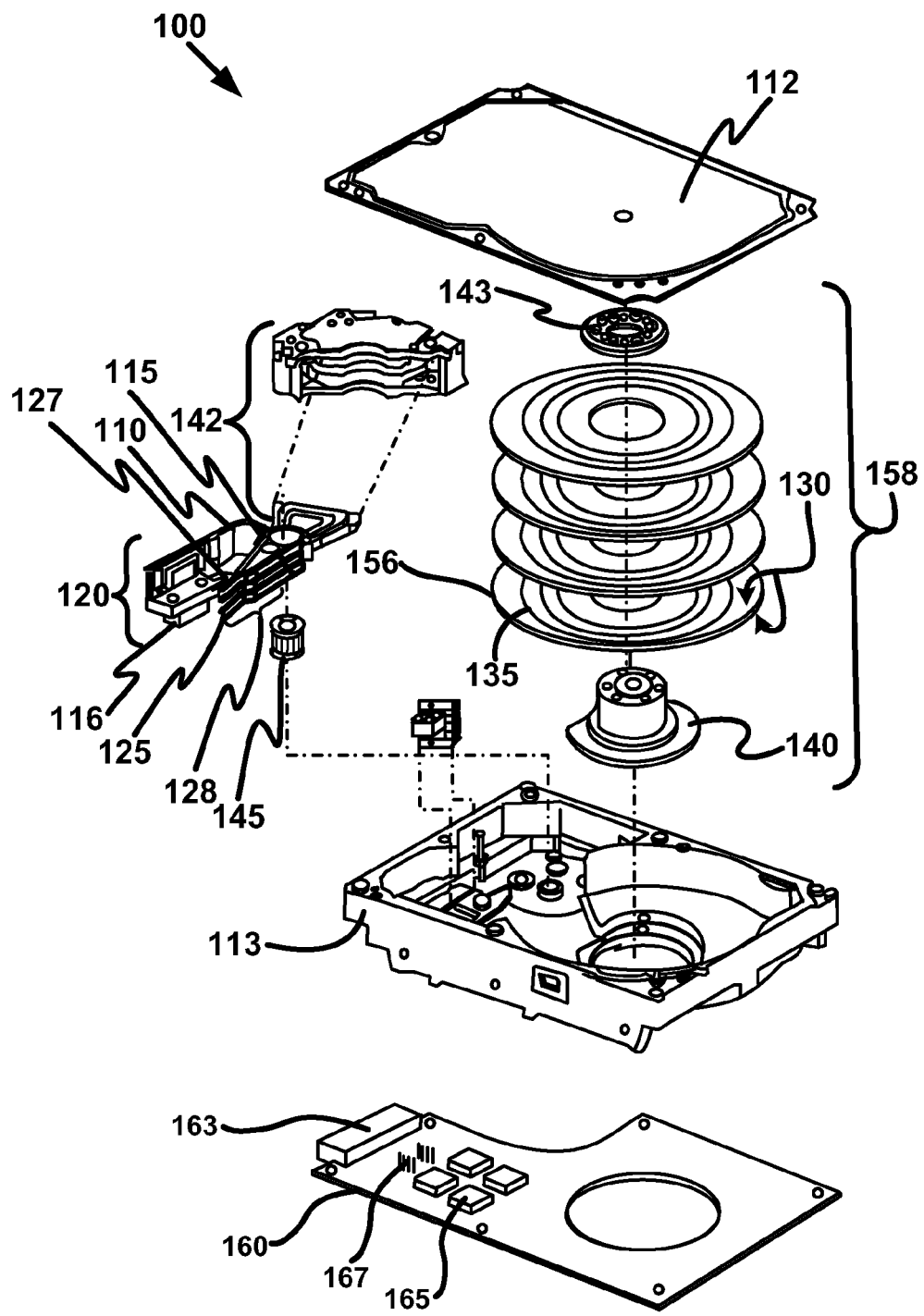
FIG. 1 illustrates an example of a HDD, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Overview of Discussion

Read and write elements or transducers reside in the slider of an HDD. As flying heights diminish, it becomes more relevant to accurately control the head-disk distance (i.e., the distance between the read-write heads and the disk). Two items that can negatively affect the fly-height of the slider are lubricant-slider interaction, such as lube pickup, and electrostatic force. The negative effects of both of these items can be diminished and/or eliminated by controlling the slider's voltage potential with respect to the disk's potential. Therefore, controlling the slider's voltage reduces slider wear and allows for lower flying-heights. This voltage-controlled slider can also be a component of other architecture features such as: fly-height modulation, active damping, pre-contact detection, fly-height measurement and control, disk defect mapping, and high-frequency detection for additional spacing feedback information.

Also, due to low fly heights, in the nanometers, disk microwaviness and disk lubricant moguls are factors that alter the topography of the surface of a disk enough to significantly alter a slider's fly height above a disk surface, even within a single revolution of a disk. Other factors, such as temperature and altitude at which a disk drive operates, can also alter the flying height of a slider in a significant manner. For example if a hard disk drive is operated at a high temperature or high altitude or both, flying height of the slider may decrease unless there is some sort of active control. As such, the active fly-height control using radio frequency feedback, as described herein, is useful for constantly monitoring and actively controlling fly height in a manner that is unaffected by variables such as temperature and altitude and which can quickly sense and react to minute disk surface variations such as micro-waviness and lubricant moguls/buildup.

Moreover, as an overview, the amplitude of the modulated high-frequency signal varies in a somewhat inverse relationship with respect to the fly height. To a point, this amplitude increases as fly-height decreases; this allows a particular amplitude to be associated with a particular fly height. In some embodiments, modulation of this received high-frequency signal is induced by injecting a low-frequency modulating signal into the slider. An amplitude associated with a desired fly height can be predetermined (such as via testing). Feedback on the amplitude of the of this portion of the received high-frequency signal can be used to control the level of a thermal fly-height control voltage supplied to a TFC heater coil on the slider to maintain this desired amplitude. In addition, the high-frequency signal can be the inherent data signal through the read transducer and/or an RF injected signal utilizing the signal lines used for the slider bias control and a fly-height/contact sensor, thereby using either the read or writer element as the receiver. This monitoring system controls the level of protrusion of the TFC heater coil along with the slider potential, and thus actively controls flying height of the slider by changing the size of this protrusion and slider potential. This is an all electronic means for active fly-height control which can be utilized within an HDD during reading, writing, or during a time when the slider is idly flying above the surface of a disk.

Example Hard Disk Drive

With reference to FIG. 1, an isometric blow-up view of an example hard disk drive, HDD 100, is presented in accordance with an embodiment of the present invention. Base casting 113 provides coupling points for components and sub-assemblies such as disk stack 158, voice coil motor (VCM) 142, and head stack assembly (HSA) 120. Disk stack 158 is coupled with base casting 113 by means of motor-hub assembly 140 and disk clamp 143. Motor-hub assembly 140 will have at least one disk 156 coupled with it such that disk 156 can rotate about an axis common to motor-hub assembly 140 and the center of disk 156. Disk 156 has at least one disk surface 130 upon which reside data tracks 135. HSA 120, at times referred to as an actuator assembly or carriage, comprises suspension 127, which suspends hard disk drive slider 125 next to disk surface 130, and HSA connector 116. In one embodiment, suspension 127 is an integrated lead suspension (ILS). Hard disk drive slider 125 includes one or more magnetic transducers or heads which read data from and write data to data tracks 135. Suspension 127 and hard disk drive slider 125 comprise the head gimbal assembly (HGA) 128. Flex cable 110, which is part of HSA 120, conveys data between HSA connector 116 and arm electronics (AE) module 115. AE module 115 controls read and write operations and, as described herein, in various embodiments includes a read-write integrated circuit (IC) (not shown). Read-write IC is coupled to slider 125 via flex cable 110 and suspension 127. In some embodiments, read-write IC is located elsewhere within HDD 100, such as on flex cable 110, within other portions of HSA 120, or on printed circuit board (PCB) 160. HSA connector 116 also conveys control data between PCB 160 and VCM 142.

HSA 120 is coupled pivotally with base casting 113 by means of pivot bearing 145, such that VCM 142 can move HGA 128 with slider 125 accurately and accurately across disk surface 130, accessing data tracks 135. Upon assembly of HSA 120, disk stack 158, VCM 142, and other components with base casting 113, cover 112 is coupled with base casting 113 to enclose these components and sub-assemblies into HDD 100.

The cover 112 is coupled with base casting 113, and PCB 160 is coupled to base casting 113. PCB 160 comprises electrical components 165 which in general perform the electrical signal processing for HDD 100, such as status checks for HDD 100, power control for motor-hub assembly 140, servo control of VCM 142, and other tasks related to reading data from and writing data to the disk media. The VCM 142 is electrically coupled with PCB 160 via HSA connector 116 and an appropriately mating connection 167 on PCB 160. Electrical coupling of HDD 100 to a host system in which HDD 100 operates is enabled in part through PCB connector 163, coupled to PCB 160. It is appreciated that PCB 160 and/or electrical component 165 can be configured in other physical manners and other locations, in other embodiments.

The displayed configuration of HDD 100 is shown by way of example and not of limitation. It is also appreciated that in some embodiments, one or more components of HDD 100 can be interchanged or shared between subassemblies while maintaining the spirit of the definitions of the aforementioned assemblies and subassemblies.

Figure 2:
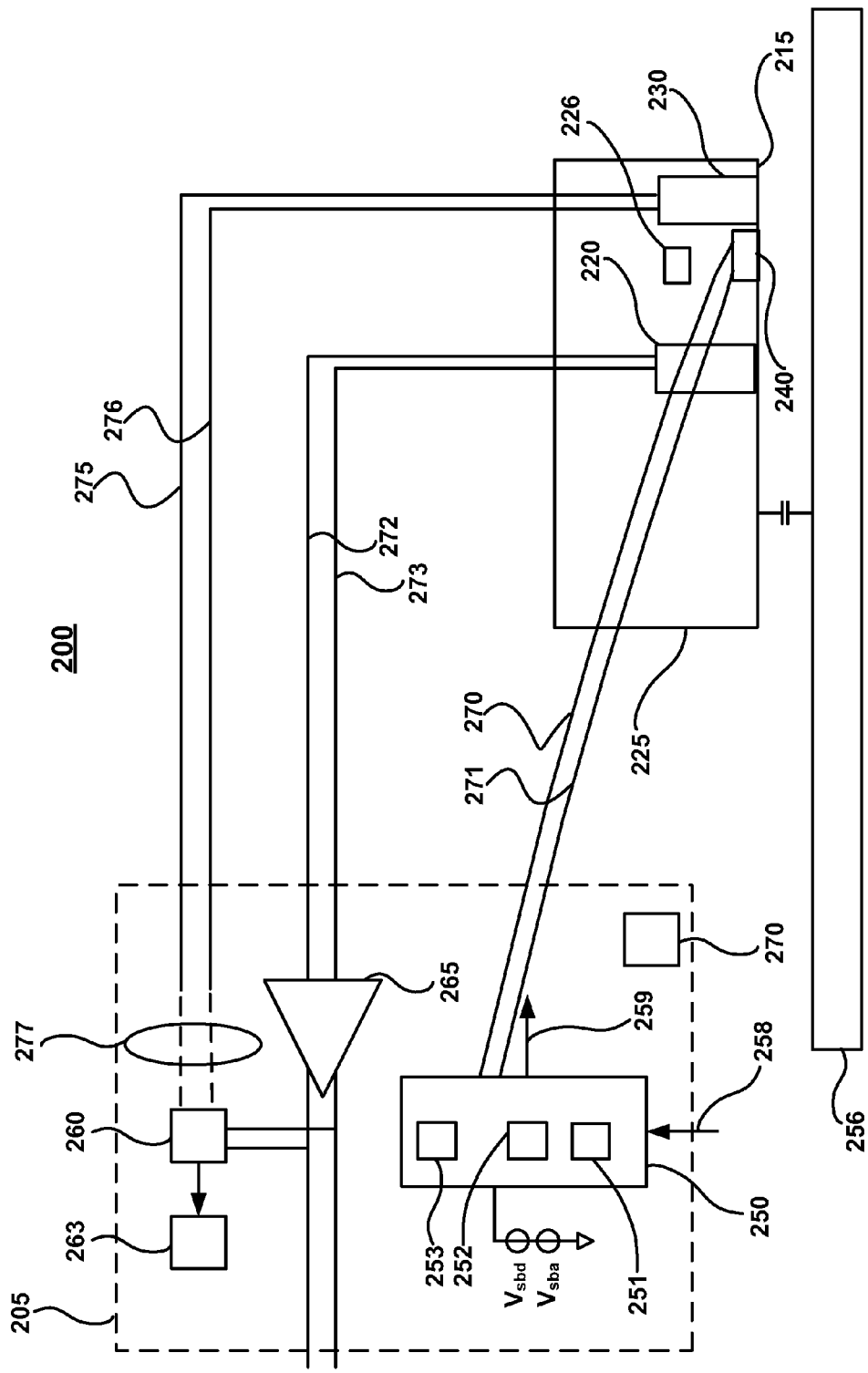
FIG. 2 illustrates an example of an integrated HDD slider bias potential control, touch-down detection and fly-height determination system, in accordance with an embodiment of the present invention.

Example Integrated System for Slider Bias Potential Control, Touch-Down Detection and Fly-Height Determination in a HDD FIG. 2 illustrates an integrated HDD slider bias potential control, touch-down detection and fly-height determination system 200 ("system 200"), in accordance to an embodiment. In various embodiments one or more components of system 200 is or can be disposed in a HDD, such as HDD 100. For purposes of example, and not of limitation, System 200 is described herein as if it is disposed within a HDD. System 200, in one embodiment, includes a slider 225 and read/write IC 205, which interact with a disk 256. In some embodiments, an existing signal path(s) is utilized for conveyance of signals between read/write IC 205 and slider 225. In some embodiments, signals that are used by system 200 for control of slider bias potential, touch-down detection, and/or fly-height determination, are integrated with preexisting signals on the existing signal lines.

By "existing signal path," what is meant is that a traditionally existing signal path, a touch-down sensor is utilized for coupling the bias voltage to slider body 225. While an existing signal path may be slightly modified, such as through the inclusion of components such as a capacitor, a coupling to a slider body connection, and/or a resistor, a separate special purpose signal path for coupling the slider bias voltage from slider bias voltage generator (not shown) to slider body 225 is not utilized. By "integrated" what is meant is that the existing signal path is primarily used for conveying signals for the touch-down sensor. However, at least sometimes, the other signal and a slider bias voltage are conveyed simultaneously, integrated together with one another, on the same signal path within the slider. Thus, this existing signal path may convey the bias voltage to slider 225 in an "integral fashion" along with the other signal and biasing for the touch-down sensor (i.e. resistive temperature detector). Several examples are illustrated herein and discussed further below.

Slider 225 includes writer 230 configured to write data to disk 256, reader 220 configured to read data from disk 256, TFC 226 configured to adjust slider fly-height (as described above) and resistive temperature detector (RTD) 240 is used to sense the temperature near the air-bearing surface (ABS). In one embodiment, reader 220 is a Tunneling Magnetoresistive (TMR) element.

RTD 240 is located proximate ABS 215 and writer 230. RTD 240 is configured to facilitate in detecting a temperature generated by slider's proximity to the disk 256 (e.g., media). In other words, RTD 240 facilitates in detecting when slider 225 changes fly-height and/or comes into physical contact with disk 256. For example, if slider 225 comes into physical contact with disk 256, then heat generated from the friction between slider 225 and disk 256 increases the resistance of RTD 240. Also, changes in fly-height changes the temperature of RTD 240. Additionally, the RTD 240 changes in temperature can be altered by air-cooling effects which can then be accounted for by a rate in change in the temperature changes in RTD 240. Accordingly, a voltage across RTD 240 changes (e.g., increases by heat generated by physical contact with disk 256). In one embodiment, real-time write-element contact is measured via RTD 240. In various embodiments, RTD 240 is a thermal stripe (e.g., metallic or semiconductor) on slider 225.

Read/write IC 205 includes an integrated fly-height checker (ITC) 250, in accordance to an embodiment. It should be appreciated that, in general, ITC 250 combines slider biasing features (e.g., dc, ac, $V_{sbd}$ and $V_{sba}$) and the biasing for the RTD 240). ITC 250 includes real-time media-disk fly-height monitor and/or contact detector 251, slider signal controller 252 and real-time relative fly-height determiner 253. In one embodiment, input 258 to ITC 250 is a touch-down (TD) or temperature reference level input (e.g., reference voltage). In another embodiment, output 259 to ITC 250 is the indication of a TD event and/or indication of temperature, i.e. fly height.

Real-time media-disk fly-height and/or contact detector 251 is configured to detect real-time slider fly-height and/or media-disk contact based on temperature generated by slider 225 contacting disk 256 (and/or temperature changes based on changes in fly height). As fly-height and/or friction caused by media-disk contact heats RTD 240, a voltage across RTD 240 increases (as described above). A bias (voltage or current) is placed across nodes 270 and 271. Accordingly, real-time media-disk fly-height and/or contact detector 251 detects real-time media-disk temperature change via a change in resistance of RTD 240 and change in voltage across RTD 240.

Slider signal controller 252 is configured to control bias potential of slider 225 with respect to voltage potential of disk 256. By setting slider body potential at the contact potential with respect to disk 256, lubrication on disk 256 will not build up on slider 225.

Slider bias potential can be controlled via RTD 240. In one embodiment, RTD 240 can be driven in a common mode on nodes 270 and 271 (e.g., direct current (DC)). For example, $V_{sbd}$ is a slider bias in a common mode is added to the differential mode across nodes 270 and 271.

Figure 3:
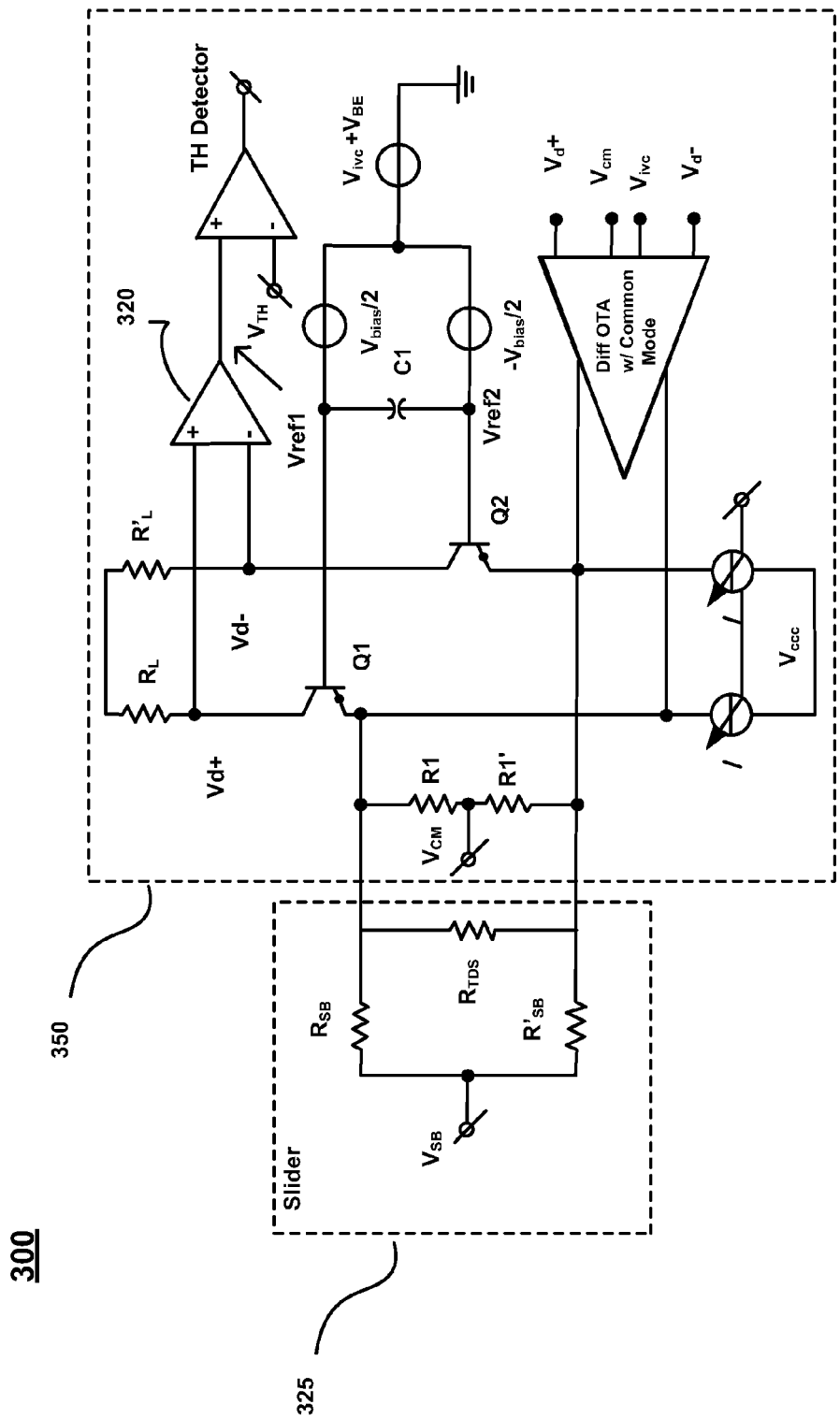
FIG. 3 illustrates an example of circuitry, in accordance with an embodiment of the present invention.

In one embodiment, RTD 240 can be driven, in a common-mode on nodes 270 and 271, alternating bias (AC) configuration (e.g., a few kilohertz (kHz)). For example, $V_{sba}$ is the slider bias in a AC configuration. An increase of an AC bias allows for AC dithering (e.g., at 250 kHz) to determine that ABS stiffness by monitoring the differential modulated signal across nodes 272 and 273 and through read amplifier 265. This method of AC dithering is utilized in a pre-contact procedure. In another embodiment, shunting at slider 225 is at a wafer level and it can be combined with resistor connections (e.g., 10 k Ohms), as shown in FIG. 3, $R_{SB}$ and $R'_{SB}$ in slider body 325. In FIG. 3, circuitry 300 for generating and controlling slider bias potential is described in detail later.

Real-time relative fly-height determiner 253 is configured to detect real-time relative fly-height of slider 225 based on analysis of a modulated portion of a Radio Frequency (RF) signal (e.g., high-frequency signal) that is capacitively coupled from RTD 240, to a portion of slider 225, such that a broadcast RF signal is injected in the slider and onto the disk 256. In one embodiment, read/write IC 205 uses broadcast RF signals injected into slider 225 to assist in determining/actively controlling a fly height of slider 225 above a disk 256. In one embodiment, read/write IC 205 generates RF signals via a signal generator 266 in conjunction with an AC slider bias, $V_{sba}$, which generates a modulated RF signal (RF carrier with low-frequency modulation). It should be appreciated that real-time relative fly-height can be determined via RTD 240, and the RF modulation technique is an optional fly-height determination method to work in conjunctions for finer resolution and adjustment. In various embodiments, an RF signal is an auxiliary RF signal.

In one embodiment, the high frequency signal is the read back data through reader 220 (e.g., read element). This read back data is modulated by the slider 225 which occurs as a result of the slider AC biasing, $V_{sba}$, which occurs as side band modulation to the read back data carrier. The modulated signal is a function of slider's ABS spacing.

In another embodiment, a high frequency RF signal (e.g., a few gigahertz (GHz)) is supplied to RTD 240. The high frequency RF signal is injected in the RTD 240 and/or slider that couples to the disk, which is then, capacitively coupled to reader 220 and/or writer 230. However, the RF signal is modulated by the AC slider biasing (e.g., 250 KHz) which occurs as side band modulation to the GHz carrier system. The sidebands are a function of slider's ABS spacing.

In another embodiment, an RF carrier signal is selected to be out-of-band above a frequency band of read data and control signals in HDD 200. For example, read data and control signals of HDD 200 are in the range of approximately 100 MHz to 3.5 GHz. As such, an RF carrier signal is generated at a frequency above 3.5 GHz.

In a further embodiment, where an out-of-band RF carrier signal is used, modulation of RF carrier signal is also taken into account when selecting the frequency of RF carrier signal. For example, if RF carrier signal is to be modulated such that a sideband is generated at 200 KHz below RF carrier signal, then RF carrier signal is generated at a frequency high enough above the frequency band of read data and control signals that such a lower band does not fall into frequency band of the data and control signals.

Demodulator 260 receives modulated read back data via amplifier 265 and demodulates one or more amplitude modulated component of modulated read back data to achieve or produce a demodulated signal. This can comprise demodulating one or more amplitude modulated sidebands (upper, lower, or both), which are modulated onto the read back data signal. In one embodiment, this comprises demodulating at least one portion of a sideband which is located approximately 100-300 kHz away from the carrier frequency of modulated read back data signal. Demodulator 260 provides the demodulated signal to amplitude measurer 263.

Similarly, demodulator 260 receives modulated RF carrier signal via amplifier 265 and demodulates one or more amplitude modulated component of modulated RF carrier signal to achieve or produce a demodulated signal. This can comprise demodulating one or more amplitude modulated sidebands (upper, lower, or both), which are modulated onto the RF carrier signal. In one embodiment, this comprises demodulating at least one portion of a sideband which is located approximately 100-300 kHz away from the carrier frequency of modulated RF carrier signal. Demodulator 260 provides the demodulated signal to amplitude measurer 263.

Alternatively, demodulator 260 receives modulated RF carrier signal via write element 230, from lines 275 and 276 with alternative connection pair 277, and demodulates one or more amplitude modulated component of modulated RF carrier signal to achieve or produce a demodulated signal. This can comprise demodulating one or more amplitude modulated sidebands (upper, lower, or both), which are modulated onto the RF carrier signal. In one embodiment, this comprises demodulating at least one portion of a sideband which is located approximately 100-300 kHz away from the carrier frequency of modulated RF carrier signal. Demodulator 260 provides the demodulated signal to amplitude measurer 263.

Amplitude measurer 263 measures an amplitude associated with an amplitude modulated component associated with the received modulated high-frequency carrier signal. In various embodiments, this can comprise measuring the amplitude of this amplitude modulated component while it is still modulated onto a carrier or after it has been demodulated into a demodulated signal. As will become more apparent, the amplitude which is measured has a strong inverse correlation with the flying height of a slider from which it is measured. Thus, a particular amplitude can be pre-associated (such as by modeling or testing) with a particular fly height of a slider 225 above a surface of a disk 256.

In one embodiment, when a minimum is reached at amplitude measurer of the low-frequency modulation 263, it is determined that slider potential is at contact potential.

Real-time relative fly-height determiner 253 is coupled with amplitude measurer 263 and is further configured for feeding back on the amplitude measured by amplitude measurer 263 in order to control generation of a thermal fly-height control (TFC) voltage. The generation of the TFC voltage which is applied to TFC element 226 is controlled such that a selected amplitude of the amplitude modulated component is achieved and maintained. In one embodiment, real-time relative fly-height determiner 253 comprises a digital, analog, or combination analog-digital circuit which compares a measured amplitude (received as feedback from slider 225) as measured by amplitude measurer 263 with a preselected and desired amplitude and then generates an appropriate control signal to instruct TFC 226 to adjust a TFC voltage (up, down, or not at all) as required to cause the measured amplitude from the slider to achieve or maintain the pre-selected amplitude value.

In some embodiments, a modulating signal is out-of-band below the frequency band of read data and control signals in a hard disk drive. This can be useful for checking the proper slider bias potential, such as, for example, in an embodiment where a modulating signal is injected via touch-down sensor lines, 270 and 271, of slider 225. In some embodiments, a generated modulating signal is also outside of the frequency band of write data signals. Due to being out-of-band, this modulating signal does not interfere with read/write/control operations of a slider when it is injected into the body of a slider, such as slider 225. It will be obvious to those skilled in the art that in the special case where the read back data and/or RF feedback active fly-height control system is used at moments when fly-height information is required for reading and writing, or during periodic predetermined intervals.

Example ITC Circuitry

FIG. 3 illustrates circuitry 300 of ITC 250 for a differential operational transconductance amplifier (Diff OTA) with controlled common-mode (CM) input, in accordance to an embodiment. Diff OTA includes inputs differential voltage ($V_d$+), common-mode voltage ($V_{cm}$), slider potential ($V_{ivc}$), and differential voltage ($V_d$−). Circuitry 300 also includes circuitry for slider 325.

An RTD bias voltage (e.g., $V_{bias}$) is imposed across bases of transistors Q1 and Q2. Diff OTA feedback forces $V_{bias}$ across RTD TD resistor ($R_{TDS}$). $R_{TDS}$ is coupled to Diff OTA. Also, $R_{SB}$ and $R'_{SB}$ are coupled to slider 325, such that there is a coupling from CM OTA input to slider 325.

An additional feedback is created by sensing $V_{cm}$ of the amplifier's input between the series coupling of resistors R1 and R1'. $V_{cm}$ is compared to $V_{IVC}$, and the feedback forces $V_{cm}$ to be equivalent with $V_{ivc}$, which is a combined series voltage of $V_{sbd}$ and $V_{sba}$. $V_{c\text{-}ref}$ would then be equal to a programmable interface voltage control ($V_{ivc}$). Setting $V_{cm}$ will then set slider bias ($V_{SB}$).

Diff OTA output ($V_d$+, $V_d$−) is coupled to a buffer 320, and then to a threshold (TH) detector. TH detector compares the input voltage (e.g. $V_{ref}$) to a programmable reference voltage ($V_{TH}$). Accordingly, if a contact asperity occurs (e.g., disk-media contact), the TD output (e.g., 259) will signal that a disturbance has occurred with the head-disk interface.

In one embodiment, slider potential is controlled by controlling a voltage, $V_{SB}$ in the slider 325, through $R_{SB}$ and $R'_{SB}$. It should be appreciated that there is a differential mode for $R_{TDS}$ and a common mode control for $V_{SB}$. Also, both modes can be operated at the same time.

In one embodiment, circuitry 300 of ITC 250 can be utilized as an RF transceiver via coupling I/O's to transistors Q1 and Q2 in which the $V_{bias}$ can include RF signal, which would impose a differential RF signal at the emitters of Q1 and Q2.

As mentioned above, the AC slider biasing will create low-frequency modulated signals on the read signals or on this auxiliary RF generated signal through the touch-down sensor connections which can be sensed through the read element 240 or the write element 230.

Example of Method for Integrating Control of Slider Bias Potential, Touch-Down Detection and Fly-Height Determination in a HDD FIG. 4 depicts a method 400 for integrating control of slider bias potential, touch-down detection and fly-height determination in a HDD, in accordance with an embodiment of the present invention. In one embodiment, method 400 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of tangible computer readable storage medium. In one embodiment, method 400 is performed at least by a system of FIGS. 1-3.

At 410 of method 400, slider bias potential is controlled with respect to a media potential, which is typically close to ground potential but can vary due to the interaction of the lubricant and spindle bearing. For example, slider signal controller 252 is configured to control bias potential of slider 225 with respect to potential of disk 256. By setting slider body potential at the contact potential with respect to disk 256 potential, lubrication on disk 256 will not build up on slider 225.

At 420 of method 400, media-disk fly-height and/or contact is detected in real-time based on temperature generated by a real-time media-disk slider spacing and/or real-time media-disk contact. In another embodiment, media-disk ABS spacing is measured and/or contact is detected in real-time based on temperature generated by a slider fly-height and/or contacting a media. For example, real-time media-disk slider fly-height and/or contact detector 251 detects real-time media-disk slider ABS changes and/or contact based on temperature generated by slider 225 contacting disk 256. As temperature caused by fly-height changes and/or media-disk slider contact heats RTD 240, a voltage across RTD 240 increases. Accordingly, real-time media-disk slider contact detector 251 detects real-time media-disk slider contact via increase in resistance of RTD 240 and increase in voltage across RTD 240. In addition, the RTD 240 increase in temperature can be altered by air-cooling effects which can then be accounted for by a rate in change in the temperature changes in RTD 240.

At 430 of method 400, fly-height of the slider is determined in real-time based on a high-frequency signal coupled to an element of a slider, wherein the controlling slider bias potential, the detecting media-disk fly-height and/or contact and the determining fly-height of the slider occur substantially simultaneously. For example, real-time relative fly-height determiner 253 detects real-time relative fly-height of slider 225 based on analysis of a modulated portion the read back signal or of a RF signal that is capacitively coupled to a portion of slider 225 and into disk 256. Moreover, read/write IC 205 uses read back signal or RF signals injected into RTD 240, slider 225 and into disk 256 to assist in determining/actively controlling a fly height of slider 225 above a disk 256. It should be appreciated that controlling slider bias potential, detecting media-disk contact and determine fly-height occur substantially simultaneously.

At 440 of method 400, a TFC element is coupled to RTD. For example, a TFC element (e.g., 226) is coupled to work with RTD (e.g., 240). At 445 of method 400, utilize read back data signal as high-frequency sign to a read transducer (e.g., 220). At 450 of method 400, the auxiliary RF signal is capacitively coupled to a read transducer (e.g., 220). At 460 of method 400, the RF signal is capacitively coupled to a write transducer (e.g., 230).

Various embodiments of the present invention are thus described. While the present invention has been described in particular embodiments, it should be appreciated that the present invention should not be construed as limited by such embodiments, but rather construed according to the following claims.

The invention claimed is:

1. A hard disk drive (HDD) comprising:
    a slider, wherein said slider comprises a resistive temperature detector (RTD) configured to detect a temperature generated by one or more of slider spacing and contact with a media of said HDD;
    a slider signal controller configured to control bias signal of a slider with respect to a media potential;
    a real-time media-disk fly-height and contact detector configured to detect one or more of temperature generated by real-time media-disk slider spacing and real-time media-disk contact; and
    a real-time relative fly-height determiner configured to detect real-time relative fly-height of said slider based on analysis of a modulated portion of a high-frequency signal coupled to an element of said slider, wherein said slider signal controller, said real-time media-disk fly-height and contact detector, and said real-time relative fly-height determiner are included in a read/write Integrated Circuit (IC) of said HDD.

2. The HDD of claim 1, comprising:
    a thermal fly-height control (TFC) element that is coupled to said RTD.

3. The HDD of claim 1, wherein a high-frequency signal coupled to an element of said slider comprises:
    utilized read back data signal coupled from storage media to said a read transducer.

4. The HDD of claim 1, wherein a high-frequency signal coupled to an element of said slider comprises:
    an auxiliary RF source coupled to an element of said slider selected from a group consisting of: write element and read element.

5. The HDD of claim 1, comprising:
    a modulation signal generator configured for generating a modulating signal that is injected into said slider to induce a sideband modulation of said high-frequency signal.

6. The HDD of claim 1, wherein said slider signal controller is further configured to control bias potential via direct current (DC) bias control.

7. The HDD of claim 1, wherein said slider signal controller is further configured to control bias potential via alternating (AC) bias control.

8. A read/write integrated circuit (IC) for a hard disk drive (HDD), wherein said read/write IC comprises:
    a slider signal controller configured to control bias signal of a slider with respect to a media potential;
    a real-time media-disk fly-height and contact detector configured to detect one or more of temperature generated by real-time media-disk slider spacing and real-time media-disk contact; and
    a real-time relative fly-height determiner configured to detect real-time relative fly-height of said slider based on analysis of a modulated portion of a high-frequency signal coupled to an element of said slider.

9. The read/write IC of claim 8, wherein said high-frequency signal coupled to an element of said slider comprises:
    an auxiliary RF signal capacitively coupled to a read transducer.

10. The read/write IC of claim 8, wherein said high-frequency signal coupled to an element of said slider comprises:
    an auxiliary RF signal capacitively coupled to a write transducer.

11. The read/write IC of claim 8, comprising:
    a modulation signal generator configured for generating a modulating signal that is injected into said slider to induce a sideband modulation of an auxiliary RF signal.

12. The read/write IC of claim 8, wherein said slider signal controller is further configured to control bias potential via direct current (DC) bias control.

13. The read/write IC of claim 8, wherein said slider signal controller is further configured to control bias potential via alternating (AC) bias control.

14. A method for integrating control of slider bias potential, touch-down detection and fly-height determination in a hard disk drive (HDD), said method comprising:
    controlling slider bias potential with respect to a media potential;
    detecting one or more of media-disk fly-height and contact in real-time based one or more of temperature generated by a real-time media-disk slider spacing and real-time media-disk contact; and
    determining fly-height of said slider in real-time based on a high-frequency signal coupled to an element of a slider, wherein said controlling slider bias potential, said detecting one or more of media-disk fly-height and contact, and said determining fly-height of said slider occur substantially simultaneously, wherein determining fly-height comprises:
    injecting a modulating signal into said slider to induce a sideband modulation of an auxiliary RF signal.

15. The method of claim 14, comprising:
    coupling a thermal fly-height control (TFC) element to a resistive temperature detector (RTD).

16. The method of claim 14, wherein determining fly-height comprises:
    analyzing of a modulated portion of an auxiliary Radio Frequency (RF) signal that is capacitively coupled to a portion of said slider.

17. The method of claim 16, comprising:
    capacitively coupling said auxiliary RF signal to a read transducer.

18. The method of claim 16, comprising:
    capacitively coupling said auxiliary RF signal to a write transducer.

* * * * *